UNITED STATES PATENT OFFICE.

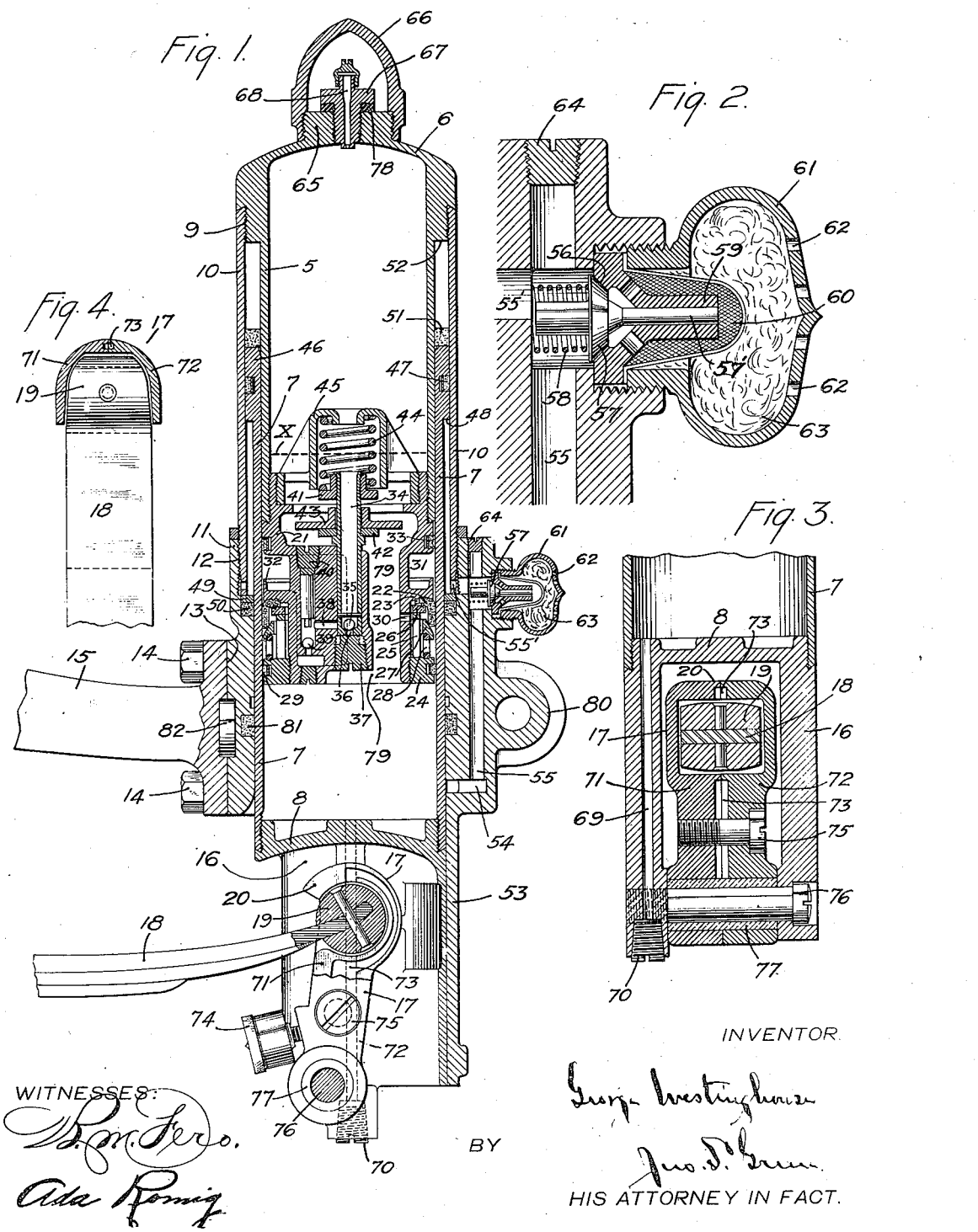

GEORGE WESTINGHOUSE, OF PITTSBURGH, PENNSYLVANIA, ASSIGNOR TO THE WESTINGHOUSE AIR SPRING COMPANY, A CORPORATION OF PENNSYLVANIA.

AUTOMOBILE AIR-SPRING.

1,185,608. Specification of Letters Patent. Patented May 30, 1916.

Application filed February 21, 1912, Serial No. 679,029. Renewed December 14, 1914. Serial No. 877,269.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Automobile Air-Springs, of which the following is a specification.

This invention relates to hydro-pneumatic devices of the type set forth in several applications for patent filed by me in the United States and various European countries. In the present case, as in the former cases, the invention is embodied in a fluid compression device adapted for use as a compression spring which may be used in any relation where two bodies are so associated that resilient movement is desirable, and the general object in view in this as well as in the former cases has been to embody the principles of resilient support by an elastic compression medium, such as air or gas in a commercially practical, self-contained, air-tight compression device adapted to serve all of the purposes and functions of the steel springs commonly used in connection therewith, and to combine when used alone or in connection therewith, all of the desirable features of steel springs and shock absorbers without the undesirable features.

My present invention also resembles that of my said prior applications in so far as a fluid tight joint between sliding surfaces is obtained by means of a cylindrical or cup leather packing tightly clamped in one of the sliding members and having its free edge presented in the direction of the high pressure and yieldingly forced into engagement with the other wall of the sliding joint by means of a rigid cone, spring pressed in a direction parallel to the axis of the device.

It also involves the use of a collecting space for the oil or sealing fluid which finds its way past the leather packing, and of an internal pump operated by the flow of fluid within the device for pumping the escaped oil back into the interior or compression chamber of the device, whereby a substantially constant amount of fluid medium within the device is maintained.

According to my present invention which is particularly applicable to motor vehicles, such as automobiles, delivery wagons, trucks, etc., and which hereinafter (without any idea of limiting the invention) will be referred to as an "automobile air spring;" some of the above mentioned parts are specifically new as to form, location and relative arrangement. In addition to said features, others are incorporated, which are more or less broadly new, for adapting the air spring to present types of automobiles.

In the drawings: Figure 1 is a side view in elevation of an air spring constructed in accordance with this invention. Fig. 2 is an enlarged detail view in section of a portion of the device and hereinafter referred to as the "cleanser." Fig. 3 is a detail view in section illustrating the manner of connecting the air spring to one of the steel leaf springs of an automobile; and Fig. 4 is a detail view of a portion of the steel leaf spring and connector.

The cushion chamber of the device is made up of a cylinder 5 provided with a head 6 and which telescopes within a cylinder 7 having a bottom 8 formed in the nature of a crosshead. Secured to head 6 at 9 is an outer cylinder 10 which acts as a cover or guard and which is threaded within a guide member 11 at 12. The guide member has a rectangular machined face 13 which is bolted by means of bolts 14 to a corresponding face of a bracket 15, adapted to be rigidly bolted or riveted to the chassis or frame of the automobile.

The crosshead 16 formed on the cylinder bottom 8 is shackled by means of a shackle 17 to one end of the steel leaf spring 18 mounted on the running gear of the automobile. The air spring it will be seen then works in series with the steel spring and if an air spring is mounted on each corner of the chassis or automobile frame and properly connected up to the steel springs on the running gear, the chassis will be supported on four air cushions operating in series with the steel springs of the car.

In order to have the air springs on the front of the car like those on the rear of the car, it is necessary that the rear end of the front springs be pivotally mounted to the chassis without shackles and that the shackles for allowing the spring to freely extend, be placed on the front end of the front springs. Fig. 1 may illustrate an air spring connected to either the rear end of a rear spring or the front end of a front spring.

In equipping cars with air springs which are already equipped with either three-quarter (¾) elliptic springs, semi-elliptic springs, or platform springs, it is only necessary to cut off the spring eye and rivet to the end of the spring a cylindrical bearing member 19 which lies within the upper end 20 of shackle 17, and to rivet or bolt to the frame or chassis a suitable bracket 15 to which the air spring is bolted. In case the car is equipped with three-quarter elliptic springs, the upper quarter spring is removed; if the car is equipped with platform springs, the cross spring is removed.

Threaded to the lower end of cylinder 5 is a plunger-head 21 which carries cup leather packing 22 for the telescopic joint. A seat 23 is formed for the cup leather packing and the packing is firmly held to the said seat by means of a nut 24 threaded to the lower end of the plunger-head and which is provided with an upright extension 25 which bears against a washer 26 in contact with the cup leather packing. A cone expander ring 27 is pressed against the inner depending lip of the cup leather packing by means of springs 28 which lie between said expander and the nut 24.

A spring-backed leather wiper ring 29 bears against the inner surface of cylinder 7 and serves to retain the oil or other sealing liquid in the chamber which contains the cup leather packing. The depending flange of the cup leather packing bears against the inner surface of tube 7, and the chamber containing the packing is in open communication with the interior of the device by means of a port 30, which port allows the oil or sealing liquid to flow into the packing chamber.

On the low pressure side of the cup leather packing the plunger-head is formed with an annular chamber 31 which is in open communication with the inner surface of cylinder 7. The lower lip 32 of chamber 31 is made sharp so as to serve as a scraper, and a spring-backed leather scraper 33 is positioned immediately above annular chamber 31 so that any sealing fluid or oil which escapes past the cup leather packing and adheres to the inner surface of the cylinder 7 will be scraped into annular chamber 31.

A hollow plunger 34 having a ball check valve 35 seated on a seat formed above the inlet 36 to the hollow plunger, serves as a single-acting pump plunger and this plunger is reciprocable within a bore formed centrally within the plunger-head 21. The lower end of the bore is closed by a screw plug 37 and in its downward movement the plunger passes an inlet port 38 which communicates through a vertical passage shown by dotted lines in Fig. 1, with annular chamber 31. A ball check 39 is located in the passage between inlet 38 and annular chamber 31 and the ball check is confined within its chamber by means of a screw plug 40.

On the upper part of the pump plunger two collars 41 and 42 are located and between these two collars a flopper disk 43 is located and is free to slide on the pump plunger. A coil spring 44 which bears against collar 41 and yieldingly holds the pump plunger down in contact with screw plug 37 is retained in position by means of a retainer 45 threaded into the upper end of plunger-head 21.

Cylinder 7 at its upper end has its outer diameter increased as shown at 46 so as to accommodate a spring-backed leather wiper 47 and to also serve as a stop for preventing the telescopic cylinders from separating, or rather for limiting the outward telescopic movement of the two cylinders 5 and 7. The lower edge 48 of the enlarged portion of the cylinder 7, when the cylinders are fully extended, will abut against a stop ring 49 placed for that purpose above a leather buffer 50 adjacent the bottom of the outer cylinder 10.

A leather buffer ring 51 rests on the top of cylinder 7 and serves as a buffer when the cylinders are in the collapsed position, and the buffer 51 will abut against the lower end 52 of head 6. The guide member 11 extends downwardly as shown at 53 to form a supporting guide for the cylinder 7 when the spring is fully extended, and this also serves as a supporting guide for the crosshead when the spring is in mid position. This guide member is cut away on the side toward the car to accommodate the steel spring 18 which enters the crosshead. The guide member is provided with air ducts 54 and 55 which communicate through openings 55' with the space between outer cylinder 10 and the middle cylinder 7. Duct 54 at its inner end terminates at the outer surface of cylinder 7 and extends substantially around the guide member.

At the inlet to duct 55 an air breather or cleanser is located which consists of a valve seat 56 against which an inwardly opening valve 57 is normally held by means of a coil spring 58. Valve 57 is provided with a guide stem 57' which moves within a guide 59 surrounding the same. A strainer screen 60 surrounds the valve and is held in place by means of a cap 61 provided with perforations 62 for the admission of air, and the interior of the cap around the strainer is filled with fibrous filter material 63.

The upper end of duct 55 is provided with a screw plug 64. By removing the plug oil may be injected into the duct 55 for lubricating purposes.

Head 6 of the air spring is provided with a threaded boss 65, and a threaded protecting cap 66 is removably screwed on to said boss. The boss 65 at its center is drilled and tapped to receive a valve plug 67 and within the central bore 68 of the valve plug an air valve, such as is now commonly used with pneumatic tires, may be located.

Crosshead 16 at one side is drilled from top to bottom as shown at 69 to provide a drain passage for the interior of the air spring, and this drain passage communicates with the interior of cylinder 7. The lower end of the passage is closed by means of the screw plug 70.

The end of the steel spring 18 to which the shackle 17 is attached, is slightly cut away as shown in Fig. 4, and as before said, bearing member 19 is riveted to the spring end. Shackle 17 is made in halves 71 and 72, and these halves are channeled as shown at 73 to provide a grease groove which extends from a grease cup 74 up to the top of bearing member 19. The halves of the shackle are secured together by means of a screw 75. The shackle is pivoted to the crosshead by means of a screw 76 which passes through a bushing 77 located within the halves of the shackle.

In use, the air spring will be charged with oil or other sealing liquid through the opening in the head which is closed by plug 67 to about the height indicated by the dotted line "X". An oil or compound that will form (under the churning which it is subjected to) a persistent froth or foam, is preferable, as such an oil or compound will completely fill the interior of the air spring with what may be termed an "oil sponge". In charging the air spring with sealing liquid, the spring will first be collapsed and then charged with the proper amount of liquid, and after the plug 67 has been replaced and screwed home so that the soft packing 78 completely seals the joint, the air spring may be charged with air by means of an ordinary tire pump until the chassis is raised by means of the air pressure to its normal position when unloaded. By regulating the quantity of sealing fluid in the spring, the rapidity with which the resistance to compression increases can be varied and therefore the scale of the spring may be varied. With both the initial tension and the scale under control, the spring action can be adjusted to whatever is desired. With the oil level above the cup leather packing, it will be seen that the air spring is completely oil sealed.

For the purpose of reducing wear on the cup leather packing and for the purpose of lubrication, it is desirable that a small amount of oil shall leak past the cup leather packing. This leakage oil will be collected in chamber 31 and will run through the vertical passage indicated by dotted lines into that portion thereof just beneath ball check 39.

As the air spring is compressed, the relative downward motion of the plunger-head 21 causes a current of oil to flow through the opening 79 (which opening extends entirely through the plunger-head) in an upward direction. This current raises the flopper disk 43 until it strikes collar 41 and lifts the pump plunger 34, which will draw in a charge of oil. When the air spring extends again, the oil current will flow through the plunger-head passage 79 in the reverse direction, carrying the flopper disk 43 downward until it strikes collar 42 and forces the pump plunger to the bottom of its stroke. The oil that was drawn into the pump plunger passes by the ball check 35 up through the plunger and is discharged back into the interior of the air spring.

During the compression movement of the air spring, air will be drawn in through the breather to the annular space between cylinders 10 and 7, and when the air spring is again extended, this air will be forced downward through ducts 55 and 54, and contacting with the outer surface of cylinder 7, will be forced between said surface and the inner surface of the guide extension 53, and will blow out any dirt or grit which has collected there.

A felt wiper ring 81 is located in a channel of the guide, and not only prevents the upward passage of dust and grit, but causes the air drawn in by the breather to flow downwardly along the guide.

A centering plug 82 of cylindrical form lies partly within the guide and partly within the bracket, and fitting snugly into the recesses makes a strong construction as it is in shear.

A semi-circular projection 80 is provided on each guide member in order that the two front air springs and the two rear air springs may be tied together by a rod or distance piece.

One very important improvement in this air spring not found in any of the other applications for patent before referred to is that the internal pump for the leaked sealing liquid delivers its charges into the compression chamber or interior of the spring during the time of least pressure therein instead of during the time of greatest pressure as in the devices of said earlier patent applications.

Having thus described my invention, what I claim is:

1. In a vehicle air spring, the combination with an inner cylinder carrying a plunger-head and an outer telescopic cylinder carrying a cross-head at its bottom, of a guard surrounding said outer cylinder and serving as a cross-head guide.

2. In a vehicle air spring, the combination with an inner cylinder carrying a plunger-head having a passage therethrough and an outer telescopic cylinder carrying a cross-head at its bottom, of a guard surrounding said outer cylinder and serving as a cross-head guide.

3. In a vehicle air spring, the combination with an inner cylinder carrying a plunger head and an outer telescopic cylinder carrying a cross-head at its bottom, of a guard cylinder surrounding said outer cylinder, a cross-head guide secured to said guard cylinder, a valved inlet for admitting air between the telescopic cylinder and the guard cylinder during the compression stroke of the air spring, and a duct for distributing the air during the expansion stroke of the air spring to the outer surface of the telescopic cylinder adjacent to said cross-head guide.

4. In a vehicle air spring, the combination with an inner cylinder carrying a plunger head provided with a cup leather packing and an outer telescopic cylinder against the inner wall of which said cup leather packing bears and provided with a bottom carrying a cross-head, of a guard cylinder surrounding said outer cylinder, and a cross-head guide secured to said guard cylinder.

5. The combination with an inner cylinder, an outer telescopic cylinder carrying a cross-head at its bottom, a guard cylinder surrounding said outer cylinder, a cross-head guide secured to said guard cylinder, a bracket bolted to said cross-head guide and adapted to be secured to the chassis of a vehicle, and a link pivoted to said cross-head and adapted to be pivotally connected to one end of one spring of the vehicle.

6. A telescopic air spring having an outer guard inclosing an annular space of variable volumetric capacity, in combination with a non-return valve for admitting air into said space and so arranged that the air so admitted is caused to travel outwardly along the inner surface of said guard.

7. In a vehicle air spring, the combination with an inner cylinder of an outer telescopic cylinder carrying a crosshead at its bottom, of a guard cylinder surrounding said outer cylinder, a crosshead guide secured to said guard cylinder, and a drain duct extending from the bottom of said crosshead to the interior of the air spring.

8. The combination of a telescopic air spring, one element of which is adapted to be rigidly connected to a vehicle chassis, a crosshead carried by a relatively movable element of said spring, a vehicle steel spring provided with an end bearing member, and a shackle for connecting said crosshead to said steel spring, said shackle being vertically split into halves and secured together.

9. In combination with a telescopic air spring having an outer guard closing in an annular space of variable volumetric capacity, an air inlet to said space, an air strainer for said inlet and a non-return valve for said inlet arranged so that air drawn into said space is caused to travel outwardly along the inner surface of said guard.

10. In combination with a telescopic air spring having an outer guard member, a bracket member adapted to be secured to the vehicle frame or chassis and to be bolted to said guard, and a centering plug lying partially within said bracket and partially within said guard.

11. The combination with a telescopic air spring, of a vehicle steel spring, a bearing member secured to one end of said steel spring, a shackle member pivotally connected to one element of said air spring and provided with a socket engaging said bearing member and a guard member partially surrounding said bearing member and said shackle.

12. The combination with a telescopic air spring the bottom of one element of which serves as a crosshead, of a vehicle steel spring, a shackle member pivotally mounted within said crosshead and engaging said steel spring and a guard member partially surrounding said bearing member and said shackle.

13. An air spring comprising two telescopic members inclosing a chamber of variable volumetric capacity, in combination with a guard cylinder surrounding said members and having a sliding contact with one of said members, a non-return valve for admitting external air into a space between said guard cylinder and the adjacent member, and means for ejecting the air so admitted across the inner face of said guard member and through said sliding contact.

14. In combination with the frame and leaf spring of a vehicle, a telescopic air spring having an outer member rigidly secured to said frame and slotted to receive the leaf spring, a cylinder telescoping within said outer member and carrying a crosshead at its bottom, means connecting the end of said steel spring with said crosshead, and a cylinder carried by said outer cylinder and telescoping within the cylinder carrying the cross-head and having a plunger-head provided with an opening therethrough for the passage of fluid.

15. In combination with the frame and leaf spring of a vehicle, an outer cylinder slotted to receive the leaf spring, rigidly secured to said frame and carrying at its bottom a crosshead guide, a cylinder telescoping within said outer cylinder and carrying a crosshead operating in said guide, means connecting the end of said leaf spring to said crosshead, a cylinder connected with said outer cylinder and telescoping within the cylinder carrying said crosshead and provided with a plunger-head having a passage therethrough for permitting the flow of fluid.

16. In combination with the frame and leaf spring of a vehicle, a telescopic air spring having an inner cylinder carrying a plunger-head with a passage therethrough from top to bottom for the passage of fluid, an outer cylinder telescoping with said inner cylinder and carrying a crosshead at its bottom, and a guard surrounding said outer cylinder serving as a crosshead guide and being slotted to receive said leaf spring, and means securing said leaf spring to said crosshead.

17. In combination in an air spring comprising telescopic members, a non-return valve communicating with the atmosphere and located externally with relation to said members, and means for drawing in a charge of air through said valve during the collapsing movement of said members, and for ejecting the air so admitted through a sliding joint between said members during the extension movement of said members.

18. A telescopic air spring having an outer guard inclosing an annular space of variable volumetric capacity, in combination with a non-return valve located externally with relation to said guard and communicating with the atmosphere, and means for drawing air through said valve into said space and for causing the air so admitted to travel outwardly along the inner face of said guard.

19. In combination with the frame and leaf spring of a vehicle, a telescopic air spring having an outer or guard cylinder, slotted to receive the leaf spring, rigidly secured to said frame and at its bottom forming a crosshead guide slotted for reception of the leaf spring, a cylinder telescoping within said outer cylinder and carrying at its bottom a crosshead, means connecting said crosshead to said leaf spring, an inner cylinder telescoping within the cylinder carrying said crosshead, a plunger-head secured to said inner cylinder having a passage therethrough from top to bottom for restricted flow of liquid, and a cupped packing carried by said plunger-head and bearing against the inner wall of the cylinder carrying the cross-head.

20. In combination with a vehicle frame and leaf spring, a telescopic air spring having an outer cylinder rigidly secured to said frame and at its bottom slotted to receive said leaf spring, a cylinder telescoping within said outer cylinder, means connecting said inner cylinder to the leaf spring, an inner cylinder stationary with relation to said outer cylinder and carrying a plunger-head carrying a packing bearing against the inner surface of said second cylinder and having a passage therethrough from top to bottom for the restricted flow of fluid, and a valve at the top of said air spring for charging the same with air.

In testimony whereof, I have hereunto subscribed my name this 20th day of Feb., 1912.

GEO. WESTINGHOUSE.

Witnesses:
JNO. S. GREEN,
H. C. TENER.